United States Patent
Ogihara et al.

(10) Patent No.: US 11,237,566 B2
(45) Date of Patent: Feb. 1, 2022

(54) CONTROL DEVICE FOR UNMANNED VEHICLE AND CONTROL METHOD FOR UNMANNED VEHICLE

(71) Applicant: Komatsu Ltd., Tokyo (JP)

(72) Inventors: Masanori Ogihara, Tokyo (JP); Ryuu Yamamura, Tokyo (JP); Akinori Baba, Tokyo (JP)

(73) Assignee: Komatsu Ltd., Tokyo (JP)

( * ) Notice: Subject to any disclaimer, the term of this patent is extended or adjusted under 35 U.S.C. 154(b) by 98 days.

(21) Appl. No.: 16/618,502

(22) PCT Filed: Oct. 31, 2018

(86) PCT No.: PCT/JP2018/040591
§ 371 (c)(1),
(2) Date: Dec. 2, 2019

(87) PCT Pub. No.: WO2019/107056
PCT Pub. Date: Jun. 6, 2019

(65) Prior Publication Data
US 2020/0125108 A1      Apr. 23, 2020

(30) Foreign Application Priority Data
Nov. 30, 2017   (JP) .............................. JP2017-231094

(51) Int. Cl.
*F01P 7/00*        (2006.01)
*B62D 5/06*        (2006.01)
*F01P 5/00*        (2006.01)
*G05D 1/02*        (2020.01)
*B62D 5/065*       (2006.01)
*B62D 5/07*        (2006.01)
(Continued)

(52) U.S. Cl.
CPC ........... *G05D 1/0223* (2013.01); *B62D 5/065* (2013.01); *B62D 5/07* (2013.01); *B62D 5/12* (2013.01); *B62D 6/00* (2013.01)

(58) Field of Classification Search
None
See application file for complete search history.

(56) References Cited

U.S. PATENT DOCUMENTS

| 5,781,870 | A | 7/1998 | Okawa |
|---|---|---|---|
| 2001/0044697 | A1 | 11/2001 | Kageyama |
| 2002/0165645 | A1 | 11/2002 | Kageyama |

(Continued)

FOREIGN PATENT DOCUMENTS

| JP | 62-181473 U | 11/1987 |
|---|---|---|
| JP | 08-137549 A | 5/1996 |

(Continued)

OTHER PUBLICATIONS

International Search Report dated Jan. 22, 2019, issued for PCT/JP2018/040591.

*Primary Examiner* — Adam D Tissot
(74) *Attorney, Agent, or Firm* — Locke Lord LLP

(57) ABSTRACT

A control device for an unmanned vehicle includes a temperature data acquisition unit acquiring temperature data of hydraulic oil supplied to a first hydraulic actuator actuating a steering device of the unmanned vehicle, and a command output unit outputting a change command for changing a travel parameter of the unmanned vehicle based on the temperature data.

19 Claims, 9 Drawing Sheets

(51) Int. Cl.
    *B62D 5/12*    (2006.01)
    *B62D 6/00*    (2006.01)

(56) References Cited

U.S. PATENT DOCUMENTS

| | | | |
|---|---|---|---|
| 2006/0175117 A1* | 8/2006 | Reuter | B62D 5/063 180/421 |
| 2012/0215395 A1* | 8/2012 | Aznavorian | G05D 1/0212 701/25 |
| 2018/0119595 A1* | 5/2018 | Villegas Muriel | F01P 7/048 |

FOREIGN PATENT DOCUMENTS

| | | |
|---|---|---|
| JP | 11-353025 A | 12/1999 |
| JP | 2000-339029 A | 12/2000 |
| JP | 2002-264833 A | 9/2002 |

* cited by examiner

FIG.4

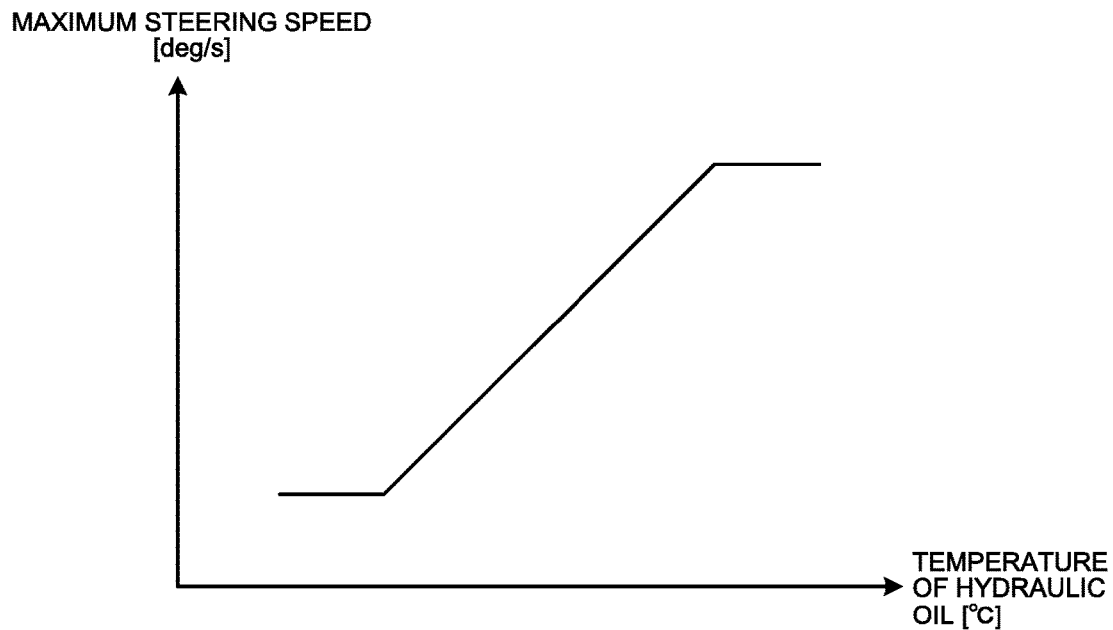

FIG.5

| TEMPERA-TURE OF HYDRAULIC OIL [°C] | FIRST UNMANNED VEHICLE | | SECOND UNMANNED VEHICLE | | THIRD UNMANNED VEHICLE | |
|---|---|---|---|---|---|---|
| | UNLOADED STATE | LOADED STATE | UNLOADED STATE | LOADED STATE | UNLOADED STATE | LOADED STATE |
| Ta | AAA | AAB | AAA | AAB | ABA | ABB |
| Tb | AAC | AAC | AAB | ABC | ABC | ABD |
| Tc | BAA | BAB | BCC | BBC | ACC | ADD |
| Td | CAA | CAB | CAC | CAD | BDD | BDE |
| Te | DAA | DAB | DAC | DBD | CAC | CEE |
| Tf | EAA | EBB | ECC | ECD | DDD | DDE |
| Tg | EAA | EBB | ECA | ECE | EAA | EAB |

CONTROL DEVICE FOR UNMANNED VEHICLE AND CONTROL METHOD FOR UNMANNED VEHICLE

FIELD

The present invention relates to a control device for an unmanned vehicle and a control method for an unmanned vehicle.

BACKGROUND

In a wide-area work location such as a mine, an unmanned vehicle is used in some cases. In the work location, a travel course for the unmanned vehicle is set. The unmanned vehicle is controlled so that the unmanned vehicle may travel along the travel course (refer to Patent Literature 1).

CITATION LIST

Patent Literature

Patent Literature 1: Japanese Laid-open Patent Publication No. H 08-137549A

SUMMARY

Technical Problem

In a case in which the work location is a cold region, the temperature of hydraulic oil actuating a hydraulic device decreases. When the viscosity of the hydraulic oil increases along with the decrease of the temperature, the responsiveness of the hydraulic device may be lowered. For example, in a case in which a steering device of an unmanned vehicle is actuated by hydraulic pressure, when the temperature of hydraulic oil decreases, and the viscosity thereof increases, the steering responsiveness of the steering device may be lowered. When the steering responsiveness of the steering device is lowered, the tracking performance of the unmanned vehicle traveling along the travel course may be lowered.

An object of an aspect of the present invention is to restrict lowering of tracking performance of an unmanned vehicle traveling along a travel course.

Solution to Problem

According to an aspect of the present invention, a control device for an unmanned vehicle comprises: a temperature data acquisition unit acquiring temperature data of hydraulic oil supplied to a first hydraulic actuator actuating a steering device of the unmanned vehicle; and a command output unit outputting a change command for changing a travel parameter of the unmanned vehicle based on the temperature data.

Advantageous Effects of Invention

According to an aspect of the present invention, it is possible to restrict lowering of tracking performance of an unmanned vehicle traveling along a travel course.

BRIEF DESCRIPTION OF DRAWINGS

FIG. 4 schematically illustrates an example of correlation data stored in a storage unit according to the first embodiment.

FIG. 5 schematically illustrates an example of the correlation data stored in the storage unit according to the first embodiment.

DESCRIPTION OF EMBODIMENTS

Embodiments of the present invention will be described below with reference to the drawings, and the present invention is not limited to these embodiments. Components of each of the embodiments described below can arbitrarily be combined. Also, some components may not be used.

First Embodiment

[Supervising System]

Figure 1:
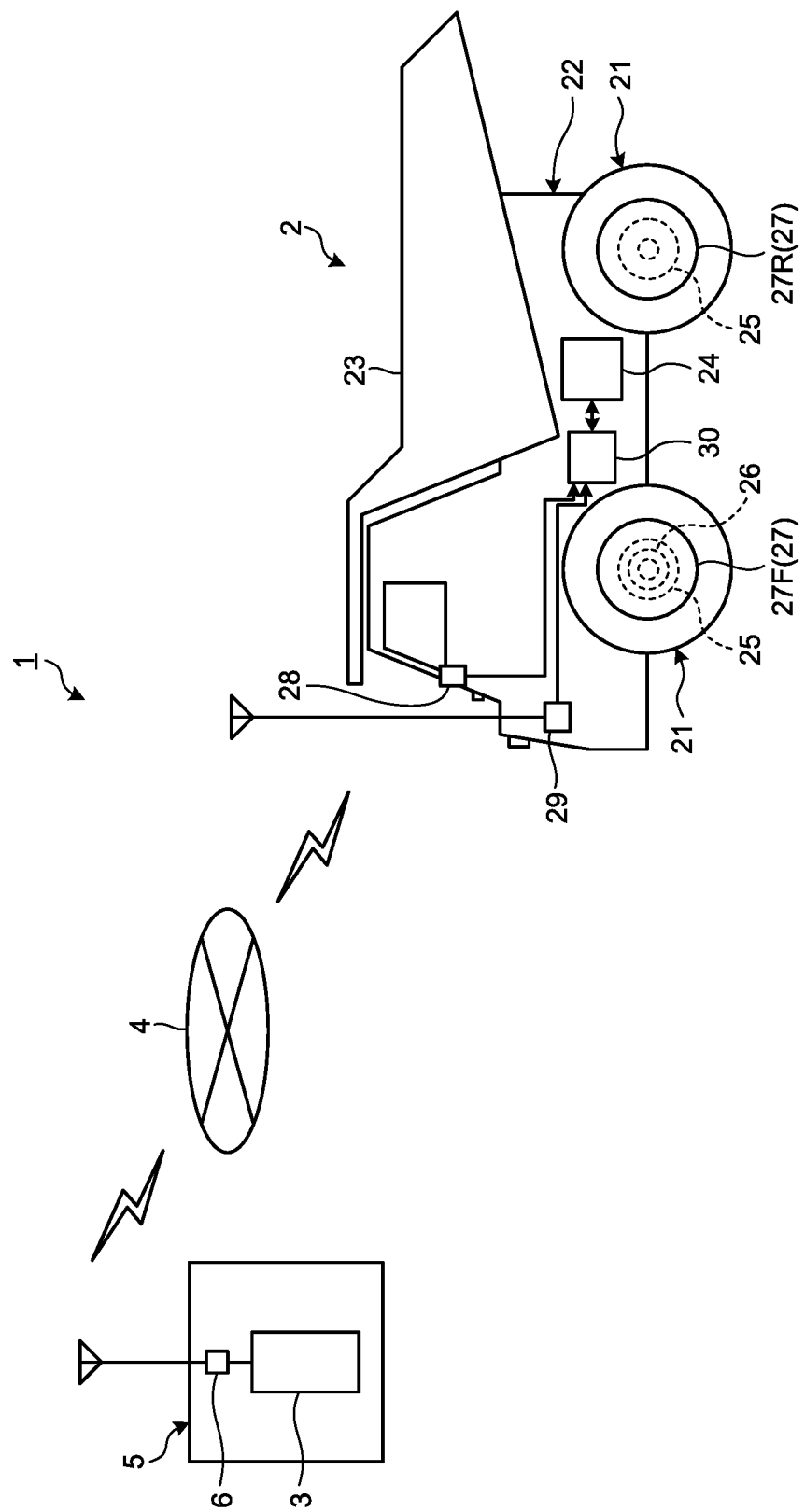
FIG. 1 schematically illustrates an example of a supervising system and an example of an unmanned vehicle according to a first embodiment.

FIG. 1 schematically illustrates an example of a supervising system 1 and an example of an unmanned vehicle 2 according to the present embodiment. The unmanned vehicle 2 is a vehicle traveling in an unmanned manner without the need for driving operation by a driver. The unmanned vehicle 2 travels based on below-mentioned travel course data from the supervising system 1. Note that the unmanned vehicle 2 may travel by means of remote operation or autonomously. The unmanned vehicle 2 is operated in a work location. In the present embodiment, the work location is a mine or a quarry, and the unmanned vehicle 2 is a dump truck traveling in the work location and carrying a load. The mine is a place or a business place for mining minerals. Examples of the load to be carried by the unmanned vehicle 2 are an ore, and earth and sand, excavated in the mine or the quarry.

The supervising system 1 includes a management device 3 and a communication system 4. The management device 3 includes a computer system and is installed in a supervising facility 5 in the mine, for example. The communication system 4 performs communication between the management device 3 and the unmanned vehicle 2. A wireless communication unit 6 is connected to the management device 3. The communication system 4 includes the wireless communication unit 6. The management device 3 and the unmanned vehicle 2 perform wireless communication via the communication system 4. The unmanned vehicle 2 travels on the work location based on travel course data from the management device 3.

[Unmanned Vehicle]

The unmanned vehicle 2 includes a travel device 21, a vehicle main body 22 supported by the travel device 21, a dump body 23 supported by the vehicle main body 22, and a control device 30.

The travel device 21 includes a drive device 24 driving the travel device 21, a brake device 25 braking the travel device 21, a steering device 26 adjusting a travel direction, and a wheel 27.

The wheel 27 is rotated to cause the unmanned vehicle 2 to travel autonomously. The wheel 27 includes a front wheel 27F and a rear wheel 27R. The wheel 27 is equipped with a tire.

The drive device 24 generates a drive force to accelerate the unmanned vehicle 2. The drive device 24 includes an internal combustion engine such as a diesel engine. Note that the drive device 24 may include a motor. Power generated in the drive device 24 is transmitted to the rear wheel 27R. The brake device 25 generates a brake force to decelerate or stop the unmanned vehicle 2. The steering device 26 can adjust a travel direction of the unmanned vehicle 2. The travel direction of the unmanned vehicle 2 includes a direction of a front part of the vehicle main body 22. The steering device 26 steers the front wheel 27F to adjust the travel direction of the unmanned vehicle 2.

The control device 30 outputs an acceleration command to actuate the drive device 24, a brake command to actuate the brake device 25, and a steering command to actuate the steering device 26. The drive device 24 generates a drive force for accelerating the unmanned vehicle 2 based on the acceleration command output by the control device 30. Output of the drive device 24 is adjusted to cause travel speed of the unmanned vehicle 2 to be adjusted. The brake device 25 generates a brake force for decelerating the unmanned vehicle 2 based on the brake command output by the control device 30. The steering device 26 generates a force for changing the direction of the front wheel 27F to cause the unmanned vehicle 2 to go straight or swing based on the steering command output by the control device 30.

Also, the unmanned vehicle 2 includes a position detection device 28 detecting a position of the unmanned vehicle 2. The position of the unmanned vehicle 2 is detected with use of a global navigation satellite system (GNSS). The global navigation satellite system includes a global positioning system (GPS). The global navigation satellite system detects an absolute position of the unmanned vehicle 2 specified by coordinate data including the latitude, longitude, and altitude. In the global navigation satellite system, the position of the unmanned vehicle 2 specified by a global coordinate system is detected. The global coordinate system is a coordinate system fixed on the earth. The position detection device 28 includes a GPS receiver and detects an absolute position (coordinates) of the unmanned vehicle 2.

The unmanned vehicle 2 is also equipped with a wireless communication unit 29. The communication system 4 includes the wireless communication unit 29. The wireless communication unit 29 can communicate with the management device 3 in a wireless manner.

[Hydraulic System]

Figure 2:
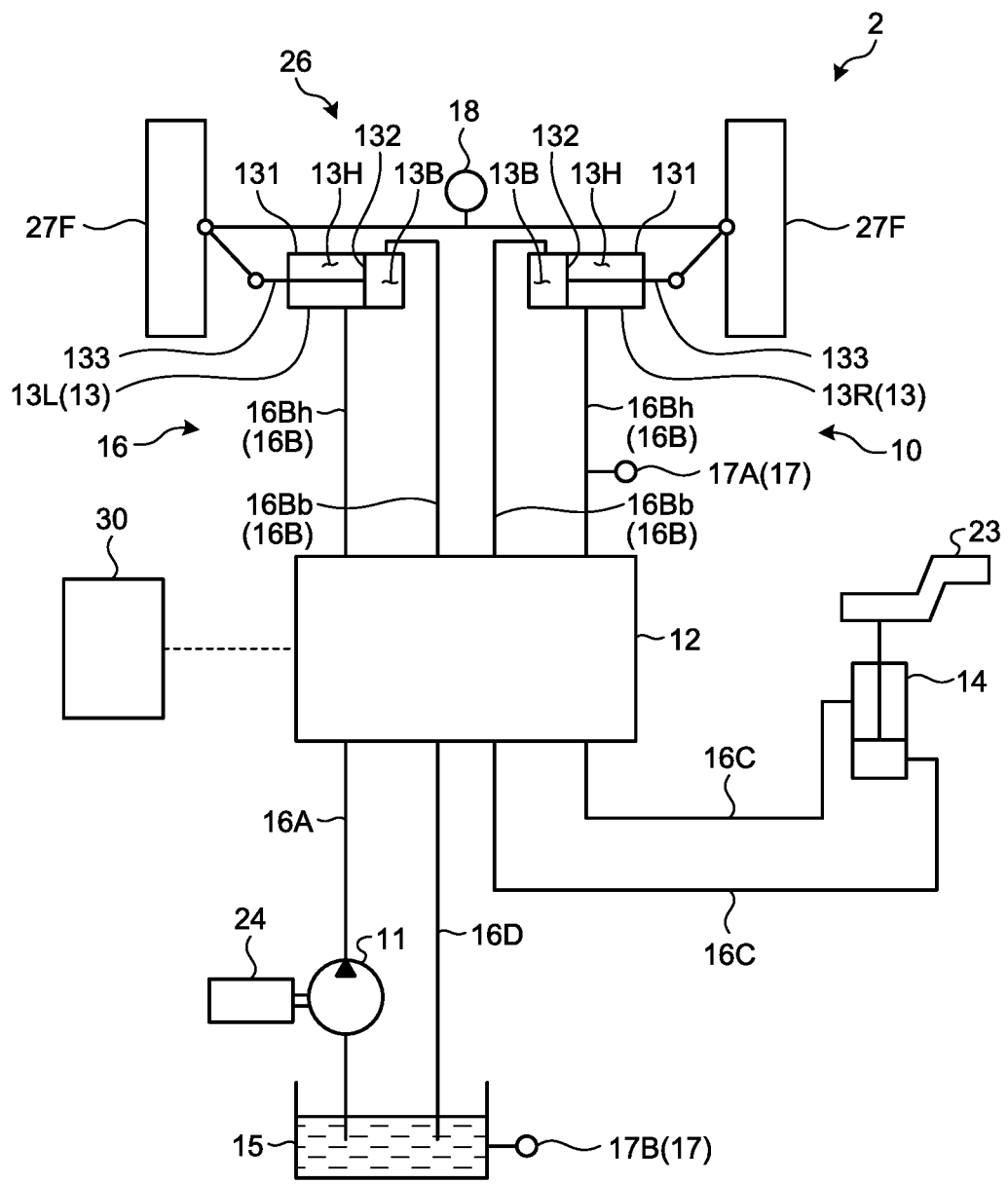
FIG. 2 schematically illustrates an example of the unmanned vehicle according to the first embodiment.

FIG. 2 schematically illustrates an example of the unmanned vehicle 2 according to the present embodiment. As illustrated in FIG. 2, the unmanned vehicle 2 includes a hydraulic system 10.

The hydraulic system 10 includes a hydraulic pump 11 actuated by the drive force generated in the drive device 24, a valve device 12 connected to the hydraulic pump 11 via a flow path, a first hydraulic actuator 13 driven based on hydraulic oil supplied from the hydraulic pump 11, a second hydraulic actuator 14 driven based on hydraulic oil supplied from the hydraulic pump 11, and a hydraulic oil tank 15 housing the hydraulic oil.

The drive device 24 is a power source for the hydraulic pump 11. The hydraulic pump 11 is a power source for the first hydraulic actuator 13 and the second hydraulic actuator 14. The hydraulic pump 11 is connected to an output shaft of the drive device 24 and is actuated by the drive force generated in the drive device 24. The hydraulic pump 11 sucks the hydraulic oil housed in the hydraulic oil tank 15 and discharges the hydraulic oil through a discharge port.

The first hydraulic actuator 13 actuates the steering device 26. The steering device 26 is actuated by power generated in the first hydraulic actuator 13. The first hydraulic actuator 13 is a hydraulic cylinder. The first hydraulic actuator 13 expands and contracts based on the flow rate of the hydraulic oil. The first hydraulic actuator 13 expands and contracts to cause the steering device 26 connected to the first hydraulic actuator 13 to be actuated.

The hydraulic oil discharged from the hydraulic pump 11 is supplied via a flow path 16A, the valve device 12, and a flow path 16B to the first hydraulic actuator 13. The hydraulic oil flowing out of the first hydraulic actuator 13 is returned via the flow path 16B, the valve device 12, and a flow path 16D to the hydraulic oil tank 15.

In the following description, the first hydraulic actuator 13 is referred to as the steering cylinder 13 as needed.

The steering cylinder 13 includes a cylinder tube 131 including a bottom, a piston 132 partitioning the internal space of the cylinder tube 131 into a bottom chamber 13B and a head chamber 13H, and a rod 133 connected to the piston 132. A flow path 16Bb is connected to the bottom chamber 13B. A flow path 16Bh is connected to the head chamber 13H.

The hydraulic oil discharged from the hydraulic pump 11 is supplied via the flow path 16A, the valve device 12, and the flow path 16Bb to the bottom chamber 13B. When the hydraulic oil is supplied to the bottom chamber 13B, the steering cylinder 13 expands.

Also, the hydraulic oil discharged from the hydraulic pump 11 is supplied via the flow path 16A, the valve device 12, and the flow path 16Bh to the head chamber 13H. When the hydraulic oil is supplied to the head chamber 13H, the steering cylinder 13 contracts.

The front wheel 27F on the left and the front wheel 27F on the right are connected via a link mechanism. In the present embodiment, the steering cylinder 13 includes a steering cylinder 13L and a steering cylinder 13R. Due to actuation of the steering cylinder 13L and the steering cylinder 13R, the front wheel 27F on the left and the front wheel 27F on the right connected via the link mechanism are actuated in synchronization. Note that the number of the steering cylinders 13 may be one.

The second hydraulic actuator 14 actuates the dump body 23. The dump body 23 is actuated by power generated in the second hydraulic actuator 14. The second hydraulic actuator 14 is a hydraulic cylinder. The second hydraulic actuator 14 expands and contracts based on the hydraulic oil. The second hydraulic actuator 14 expands and contracts to cause the dump body 23 connected to the second hydraulic actuator 14 to move in an up-down direction.

The hydraulic oil discharged from the hydraulic pump 11 is supplied via the flow path 16A, the valve device 12, and a flow path 16C to the second hydraulic actuator 14. The hydraulic oil flowing out of the second hydraulic actuator 14 is returned via the flow path 16C, the valve device 12, and the flow path 16D to the hydraulic oil tank 15.

In the following description, the second hydraulic actuator 14 is referred to as the hoist cylinder 14 as needed.

The valve device 12 is actuated based on an operation command from the control device 30. The valve device 12 can adjust a flowing state of the hydraulic oil in a hydraulic circuit 16 connected to the steering cylinder 13 and the hoist cylinder 14. The valve device 12 includes a first flow rate adjusting valve enabling the flow rate and the direction of the hydraulic oil supplied to the steering cylinder 13 to be adjusted and a second flow rate adjusting valve enabling the flow rate and the direction of the hydraulic oil supplied to the hoist cylinder 14 to be adjusted.

Also, the hydraulic circuit 16 is provided with a temperature sensor 17 detecting a temperature of the hydraulic oil supplied to the steering cylinder 13. The temperature sensor 17 includes a temperature sensor 17A detecting a temperature of the hydraulic oil in the flow path 16B connected to the steering cylinder 13 and a temperature sensor 17B detecting a temperature of the hydraulic oil in the hydraulic oil tank 15.

Also, the steering device 26 is provided with a steering angle sensor 18 detecting a steering angle of the steering device 26. The steering angle sensor 18 includes a potentiometer, for example.

[Management Device and Control Device]

Figure 3:
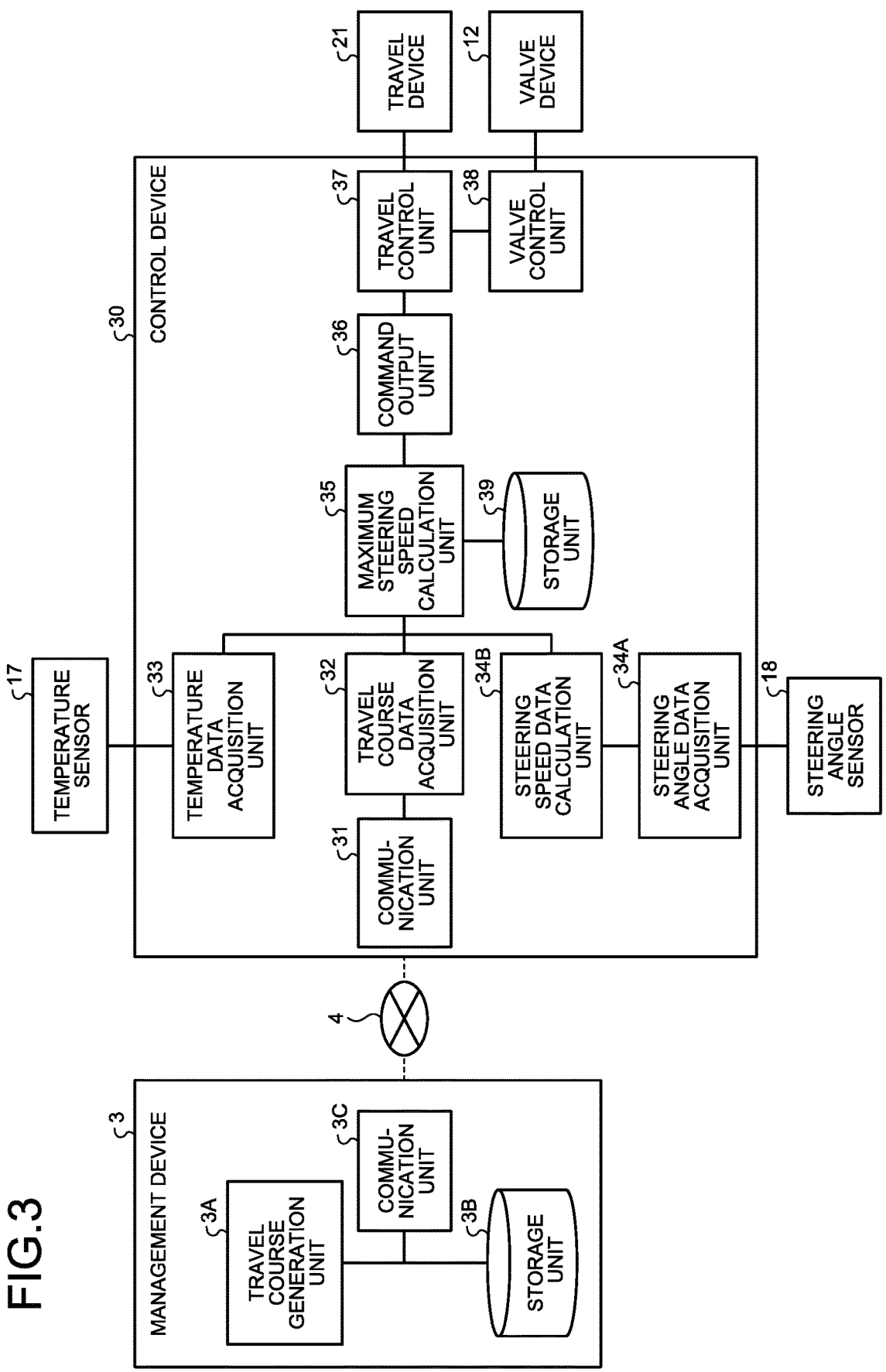
FIG. 3 is a functional block diagram illustrating an example of a management device and an example of a control device according to the first embodiment.

FIG. 3 is a functional block diagram illustrating an example of the management device 3 and an example of the control device 30 according to the present embodiment. The control device 30 can communicate with the management device 3 via the communication system 4.

The management device 3 includes a travel course generation unit 3A generating a travel course, a storage unit 3B, and a communication unit 3C.

The travel course generation unit 3A generates travel course data including a travel course. The travel course indicates a target travel path for the unmanned vehicle 2. Also, the travel course data includes target travel speed and a target travel direction at each of a plurality of points provided on the travel course at intervals. The storage unit 3B stores a program required to generate the travel course data in the travel course generation unit 3A. The travel course generation unit 3A outputs the generated travel course data to the communication unit 3C. The communication unit 3C transmits the travel course data to the control device 30 for the unmanned vehicle 2.

The control device 30 includes a communication unit 31, a travel course data acquisition unit 32, a temperature data acquisition unit 33, a steering angle data acquisition unit 34A, a steering speed data calculation unit 34B, a maximum steering speed calculation unit 35, a command output unit 36, a travel control unit 37, a valve control unit 38, and a storage unit 39.

The travel course data acquisition unit 32 acquires the travel course data transmitted from the management device 3 via the communication unit 31.

The temperature data acquisition unit 33 acquires temperature data indicating a temperature T of the hydraulic oil supplied to the steering cylinder 13 detected by the temperature sensor 17.

The steering angle data acquisition unit 34A acquires steering angle data indicating a steering angle $\theta$ of the steering device 26 detected by the steering angle sensor 18.

The steering speed data calculation unit 34B calculates steering speed data indicating steering speed $V\theta$ of the steering device 26 based on the steering angle data acquired by the steering angle data acquisition unit 34A. The steering speed $V\theta$ is a change amount of the steering angle $\theta$ per unit time.

The maximum steering speed calculation unit 35 calculates maximum steering speed $V\theta max$ of the steering device 26 based on the temperature data of the hydraulic oil acquired by the temperature data acquisition unit 33. The maximum steering speed $V\theta max$ of the steering device 26 is a maximum value for the steering speed $V\theta$ at which the steering device 26 can steer. The steering device 26 is actuated based on power generated in the steering cylinder 13. Viscosity $\eta$ of the hydraulic oil actuating the steering cylinder 13 changes based on the temperature T of the hydraulic oil. In a case in which the viscosity $\eta$ of the hydraulic oil is high, the piston 132 of the steering cylinder 13 cannot move at high speed, and the maximum moving speed at which the piston 132 of the steering cylinder 13 can move is thus lowered. In a case in which the maximum moving speed of the piston 132 is lowered, the maximum steering speed $V\theta max$ of the steering device 26 is lowered. In a case in which the viscosity $\eta$ of the hydraulic oil is low, the piston 132 of the steering cylinder 13 can move at high speed. As a result, the maximum moving speed at which the piston 132 of the steering cylinder 13 can move is raised. In a case in which the maximum moving speed of the piston 132 is raised, the maximum steering speed $V\theta max$ of the steering device 26 is raised. The maximum steering speed calculation unit 35 can calculate (estimate) the maximum steering speed $V\theta max$ of the steering device 26 based on the temperature data of the hydraulic oil detected by the temperature sensor 17.

The command output unit 36 outputs a change command for changing a travel parameter of the unmanned vehicle 2 based on the temperature data of the hydraulic oil. The travel parameter is included in the travel course data transmitted from the management device 3 to the control device 30. In the present embodiment, the travel parameter includes limiting travel speed $Vsmax$ of the unmanned vehicle 2. The limiting travel speed $Vsmax$ is a limit value (maximum speed) for limiting travel speed $Vs$ of the unmanned vehicle 2. The command output unit 36 outputs a change command for changing the limiting travel speed $Vsmax$ based on the temperature data of the hydraulic oil. In the present embodiment, the command output unit 36 outputs a change command for changing the limiting travel speed $Vsmax$ for limiting the travel speed $Vs$ of the unmanned vehicle 2 based on the maximum steering speed $V\theta max$ calculated from the temperature data of the hydraulic oil.

The travel control unit 37 outputs to the travel device 21 an operation command for controlling the travel device 21 including the steering device 26 based on the limiting travel speed $Vsmax$, which is a changed travel parameter. The operation command is a command for controlling a travel state of the travel device 21 and is determined based on the travel course data and the travel parameter. The travel state of the travel device 21 includes driving, braking, and swinging of the travel device 21. The travel control unit 37 outputs to the travel device 21 an operation command for causing the travel device 21 to drive, brake, and swing based on the travel course data and the limiting travel speed $Vsmax$, which is a travel parameter.

The valve control unit 38 outputs a control command for controlling the valve device 12 to the valve device 12. The valve device 12 includes the first flow rate adjusting valve enabling a flow rate Q of the hydraulic oil per unit time supplied to the steering cylinder 13 to be adjusted. In the following description, the flow rate Q of the hydraulic oil supplied to the steering cylinder 13 when the first flow rate adjusting valve is in a fully opened state is referred to as a maximum flow rate Qmax of the hydraulic oil as needed.

[First Calculation Method of Maximum Steering Speed]

Next, a first calculation method of the maximum steering speed V$\theta$max of the steering device 26 by means of the maximum steering speed calculation unit 35 will be described.

In the present embodiment, the storage unit 39 has stored therein correlation data between the temperature T of the hydraulic oil and the maximum steering speed V$\theta$max of the steering device 26. The maximum steering speed calculation unit 35 can calculate the maximum steering speed V$\theta$max of the steering device 26 based on the temperature data of the hydraulic oil detected by the temperature sensor 17 and the correlation data stored in the storage unit 39.

FIG. 4 schematically illustrates an example of the correlation data stored in the storage unit 39 according to the present embodiment. In FIG. 4, the horizontal axis represents the temperature T of the hydraulic oil, and the vertical axis represents the maximum steering speed V$\theta$max. As described above, the viscosity $\eta$ of the hydraulic oil changes based on the temperature T of the hydraulic oil. In a case in which the viscosity $\eta$ of the hydraulic oil is high, the maximum moving speed at which the piston 132 of the steering cylinder 13 can move is lowered, and the maximum steering speed V$\theta$max of the steering device 26 is thus lowered. In a case in which the viscosity $\eta$ of the hydraulic oil is low, the maximum moving speed at which the piston 132 of the steering cylinder 13 can move is raised, and the maximum steering speed V$\theta$max of the steering device 26 is thus raised.

The correlation data is derived in advance by an experiment or a simulation. The derived correlation data is stored in the storage unit 39.

FIG. 5 schematically illustrates an example of the correlation data stored in the storage unit 39 according to the present embodiment. As illustrated in FIG. 5, the storage unit 39 has stored therein table data indicating the relationship between the temperature T of the hydraulic oil and the maximum steering speed V$\theta$max. In the present embodiment, respective pieces of the correlation data are derived for a plurality of unmanned vehicles 2 and are stored. In the example illustrated in FIG. 5, the respective correlation data pieces for a first unmanned vehicle 2, a second unmanned vehicle 2, and a third unmanned vehicle 2 are stored. Also, for each of the plurality of unmanned vehicles 2, the correlation data in an unloaded state, in which the dump body 23 is not loaded, and the correlation data in a loaded state, in which the dump body 23 is loaded, are derived and stored.

Note that each of FIGS. 4 and 5 illustrates the correlation data when the first flow rate adjusting valve is in a fully opened state and when as much hydraulic oil as the maximum flow rate Qmax is supplied to the steering cylinder 13.

The maximum steering speed calculation unit 35 can derive the maximum steering speed V$\theta$max of the steering device 26 when the temperature of the hydraulic oil is a certain temperature T based on the temperature data of the hydraulic oil detected by the temperature sensor 17 and the correlation data stored in the storage unit 39.

[Second Calculation Method of Maximum Steering Speed]

Next, a second calculation method of the maximum steering speed V$\theta$max of the steering device 26 by means of the maximum steering speed calculation unit 35 will be described.

While the unmanned vehicle 2 is traveling, the valve control unit 38 controls the valve device 12 and sets the first flow rate adjusting valve adjusting the flow rate Q of the hydraulic oil supplied to the steering cylinder 13 in a fully opened state. The steering speed data calculation unit 34B calculates steering speed data indicating the steering speed V$\theta$ of the steering device 26 when as much hydraulic oil as the maximum flow rate Qmax is supplied to the steering cylinder 13

Figure 6:
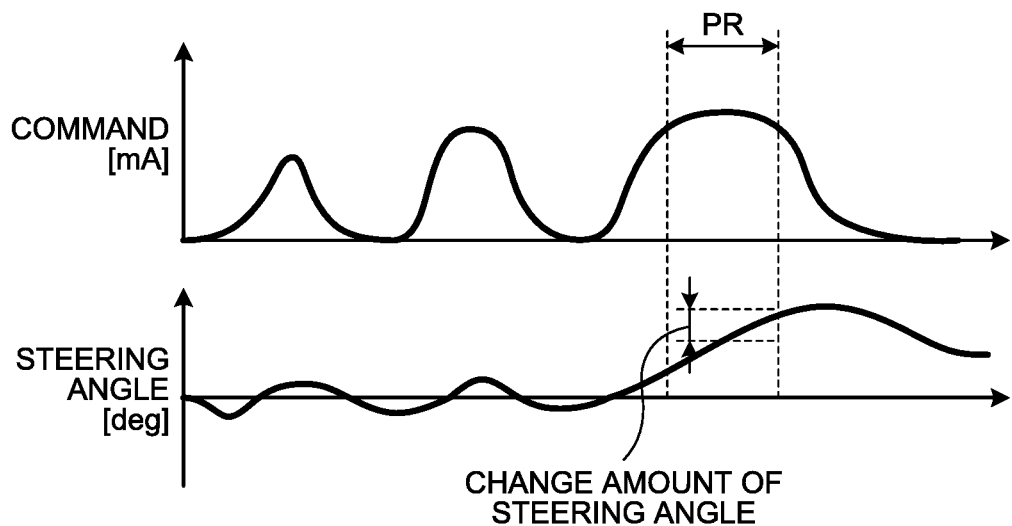
FIG. 6 illustrates the relationship between a control command output to a valve device and a steering angle when the unmanned vehicle is traveling according to the first embodiment.

FIG. 6 illustrates the relationship between a control command (current) output to the valve device 12 and the steering angle $\theta$ when the unmanned vehicle 2 is traveling according to the present embodiment. When the unmanned vehicle 2 is traveling, a period PR, in which the first flow rate adjusting valve of the valve device 12 is in a fully opened state and in which as much hydraulic oil as the maximum flow rate Qmax is supplied to the steering cylinder 13, is generated. The steering angle $\theta$ in the period PR is detected by the steering angle sensor 18. The maximum steering speed calculation unit 35 can calculate the steering speed V$\theta$ based on the detection data of the steering angle sensor 18.

As much hydraulic oil as the maximum flow rate Qmax is supplied to the steering cylinder 13 to cause the piston 132 of the steering cylinder 13 to move at the maximum moving speed and to cause the steering device 26 to be actuated at the maximum steering speed V$\theta$max. The maximum steering speed calculation unit 35 can calculate the maximum steering speed V$\theta$max based on the steering speed data detected by the steering angle sensor 18 in the period PR. The maximum steering speed calculation unit 35 can calculate the maximum steering speed V$\theta$max when the temperature of the hydraulic oil is the temperature T based on the temperature T of the hydraulic oil detected by the temperature sensor 17 in the period PR.

[Travel Course]

Figure 7:
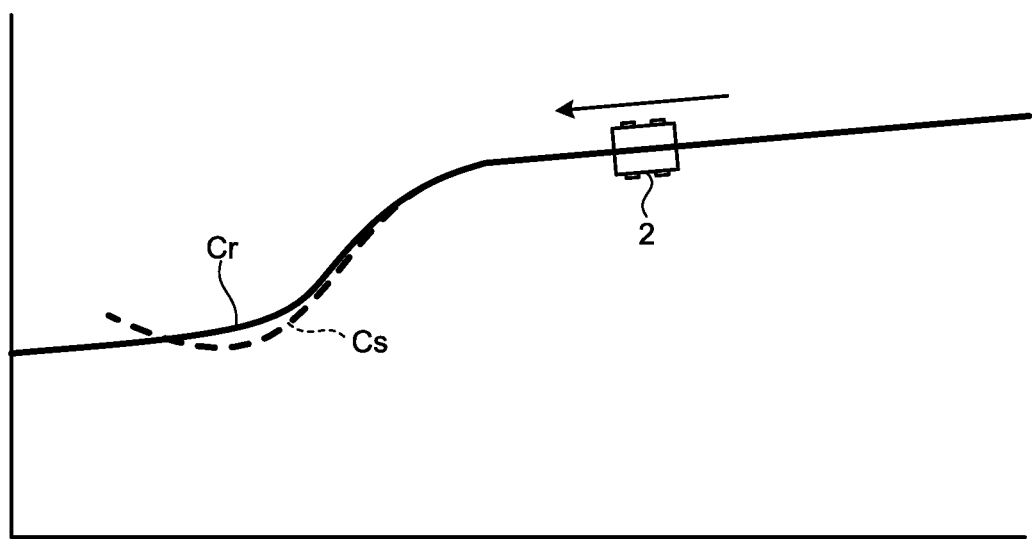
FIG. 7 schematically illustrates an example of a travel course according to the first embodiment.

FIG. 7 schematically illustrates an example of a travel course Cr according to the present embodiment. As illustrated in FIG. 7, the unmanned vehicle 2 is controlled so that the unmanned vehicle 2 may travel along the travel course Cr. In a case in which the viscosity $\eta$ of the hydraulic oil is high, and in which the steering responsiveness of the steering device 26 is lowered, an actual travel trajectory Cs of the unmanned vehicle 2 is out of the travel course Cr as illustrated in FIG. 7. The steering responsiveness of the steering device 26 includes time required after the valve control unit 38 outputs a control command to the valve device 12 to actuate the steering device 26 based on the travel course data before the actual steering angle $\theta$ of the steering device 26 reaches a target steering angle $\theta$ref in accordance with the control command.

In a case in which the viscosity $\eta$ of the hydraulic oil is high, even when a control command is output to the valve device 12, it takes time before the actual steering angle $\theta$ of the steering device 26 reaches the target steering angle $\theta$ref in accordance with the control command. As a result, as illustrated in FIG. 7, a difference occurs between the travel course Cr and the actual travel trajectory Cs.

Under such circumstances, in the present embodiment, in a case in which, when the unmanned vehicle 2 swings (goes around a curve), the temperature T of the hydraulic oil is low, and the viscosity $\eta$ of the hydraulic oil is high, the command output unit 36 lowers the limiting travel speed Vsmax of the unmanned vehicle 2 to let the unmanned vehicle 2 travel at low speed. Accordingly, even in a case in which the steering responsiveness of the steering device 26 is low, the unmanned vehicle 2 can travel along the travel course Cr. Conversely, in a case in which the temperature T of the hydraulic oil is high, and the viscosity η of the hydraulic oil is low, the command output unit 36 raises the limiting travel speed Vsmax of the unmanned vehicle 2 to let the unmanned vehicle 2 travel at high speed. Since the steering responsiveness of the steering device 26 is high when the temperature T of the hydraulic oil is high, the unmanned vehicle 2 can travel along the travel course Cr.

Also, in the present embodiment, in a case in which the change rate of the curvature of the curve which the unmanned vehicle 2 goes around is high (in a case in which the degree of curve is high), the command output unit 36 lowers the limiting travel speed Vsmax of the unmanned vehicle 2 to let the unmanned vehicle 2 travel at low speed. Accordingly, the unmanned vehicle 2 can travel along the travel course Cr. Conversely, in a case in which the change rate of the curvature of the curve which the unmanned vehicle 2 goes around is low (in a case in which the degree of curve is low), the command output unit 36 raises the limiting travel speed Vsmax of the unmanned vehicle 2 to let the unmanned vehicle 2 travel at high speed. In a case in which the change rate of the curvature of the curve is low, the unmanned vehicle 2 can travel along the travel course Cr even at high speed.

In this manner, the command output unit 36 can derive a change rate of curvature of a curve which the unmanned vehicle 2 goes around from travel course data generated in the travel course generation unit 3A. The command output unit 36 changes the limiting travel speed Vsmax serving as a travel parameter of the unmanned vehicle 2 based on temperature data of the hydraulic oil so that the unmanned vehicle 2 may travel along the travel course.

In the present embodiment, the valve control unit 38 controls the valve device 12 so that the steering device 26 may be actuated at the maximum steering speed Vθmax. That is, the valve control unit 38 sets the first flow rate adjusting valve in a fully opened state when the unmanned vehicle 2 is caused to swing. The command output unit 36 changes the limiting travel speed Vsmax so that the unmanned vehicle 2 may travel along the travel course Cr when the steering device 26 is actuated at the maximum steering speed Vθmax.

The command output unit 36 can calculate based on a predetermined calculation formula the limiting travel speed Vsmax at which the unmanned vehicle 2 can travel along the curve in the travel course when the steering device 26 is steered at the maximum steering speed Vθmax. Meanwhile, correlation data indicating a relationship between the maximum steering speed Vθmax and the limiting travel speed Vsmax of the unmanned vehicle 2 at which the unmanned vehicle 2 can travel along the curve in the travel course may be derived by an experiment or a simulation in advance and may be stored in the storage unit 39. The command output unit 36 may calculate based on the correlation data stored in the storage unit 39 the limiting travel speed Vsmax at which the unmanned vehicle 2 can travel along the curve in the travel course when the steering device 26 is steered at the maximum steering speed Vθmax.

[Control Method]

Figure 8:
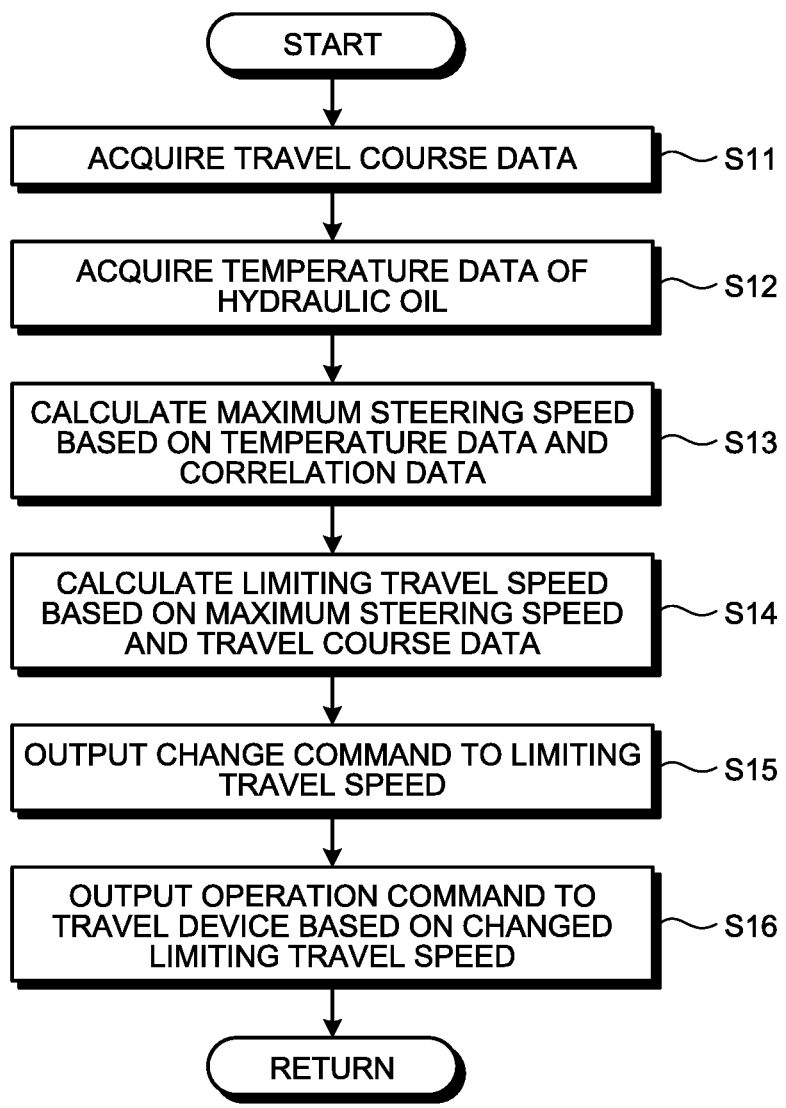
FIG. 8 is a flowchart illustrating an example of a control method for an unmanned vehicle according to the first embodiment.

FIG. 8 is a flowchart illustrating an example of a control method for the unmanned vehicle 2 according to the present embodiment. In the management device 3, the travel course generation unit 3A generates travel course data. The travel course data includes a change rate of curvature of a curve in a travel course and travel speed Vsdef indicating an initial value for the travel speed Vs of the unmanned vehicle 2, for example. The travel speed Vsdef is travel speed Vs at which the unmanned vehicle 2 can travel along the curve in the travel course when the temperature T of the hydraulic oil is a specified initial temperature (for example, an ordinary temperature). In a case in which the temperature T of the hydraulic oil reaches the initial temperature, the steering device 26 is actuated at the maximum steering speed Vθmax. Hence, even when the unmanned vehicle 2 travels at the travel speed Vsdef, the unmanned vehicle 2 can travel along the curve in the travel course. The management device 3 transmits the generated travel course data via the communication system 4 to the control device 30 for the unmanned vehicle 2.

In the control device 30, the travel course data acquisition unit 32 acquires the travel course data (Step S11). By acquiring the travel course data, the travel course data acquisition unit 32 can acquire the change rate of the curvature of the curve in the travel course. By acquiring the travel course data, the travel course data acquisition unit 32 can also acquire the travel speed Vsdef.

The temperature data acquisition unit 33 acquires temperature data of the hydraulic oil from the temperature sensor 17 (Step S12). In the present embodiment, the temperature data acquisition unit 33 acquires temperature data of the hydraulic oil from the temperature sensor 17A. Meanwhile, the temperature data acquisition unit 33 may acquire temperature data of the hydraulic oil from the temperature sensor 17B.

The maximum steering speed calculation unit 35 calculates the maximum steering speed Vθmax of the steering device 26 corresponding to the temperature T of the hydraulic oil acquired by the temperature data acquisition unit 33 based on the temperature data of the hydraulic oil acquired by the temperature data acquisition unit 33 and correlation data, stored in the storage unit 39, indicating a relationship between the temperature T of the hydraulic oil and the maximum steering speed Vθmax of the steering device 26 (Step S13).

The command output unit 36 calculates the limiting travel speed Vsmax at which the unmanned vehicle 2 can travel along the curve in the travel course when the steering device 26 is steered at the maximum steering speed Vθmax based on the maximum steering speed Vθmax of the steering device 26 calculated in Step S13 and the travel course data acquired by the travel course data acquisition unit 32 (Step S14).

The command output unit 36 outputs a change command for changing the travel speed Vsdef into the limiting travel speed Vsmax when the limiting travel speed Vsmax is lower than the travel speed Vsdef (Step S15).

The travel control unit 37 outputs to the travel device 21 an operation command for controlling the travel device 21 of the unmanned vehicle 2 including the steering device 26 based on the changed limiting travel speed Vsmax (Step S16).

The unmanned vehicle 2 goes around the curve in the travel course based on the changed limiting travel speed Vsmax. Since the unmanned vehicle 2 travels at the travel speed Vs equal to or lower than the changed limiting travel speed Vsmax, the unmanned vehicle 2 can travel along the travel course even in a case in which the steering responsiveness of the steering device 26 is low.

[Effect]

As described above, according to the present embodiment, the control device 30 for the unmanned vehicle 2 includes the temperature data acquisition unit 33 acquiring temperature data of the hydraulic oil supplied to the steering cylinder 13 actuating the steering device 26 of the unmanned vehicle 2 and the command output unit 36 outputting a change command for changing the limiting travel speed Vsmax of the unmanned vehicle 2 based on the temperature data of the hydraulic oil. Accordingly, even in a case in which the work location is a cold region, in which the viscosity $\eta$ of the hydraulic oil increases along with a decrease of the temperature T of the hydraulic oil, and in which the steering responsiveness of the steering device 26 is lowered, the unmanned vehicle 2 can travel along the travel course by changing the limiting travel speed Vsmax based on the temperature data of the hydraulic oil. For example, when the temperature T of the hydraulic oil is low, the unmanned vehicle 2 can travel along the travel course by setting the limiting travel speed Vsmax of the unmanned vehicle 2 to a low value to cause the unmanned vehicle 2 to travel at low speed. Also, when the temperature T of the hydraulic oil is low, and the change rate of the curvature of the curve in the travel course is high, the unmanned vehicle 2 can travel along the travel course by setting the limiting travel speed Vsmax of the unmanned vehicle 2 to a lower value to cause the unmanned vehicle 2 to travel at lower speed. Also, when the temperature T of the hydraulic oil is high, the unmanned vehicle 2 can travel along the travel course while the work efficiency (carrying efficiency) of the unmanned vehicle 2 can be improved by setting the limiting travel speed Vsmax of the unmanned vehicle 2 to a high value to cause the unmanned vehicle 2 to travel at high speed.

In this manner, according to the present embodiment, it is possible to restrict lowering of tracking performance indicating travel performance of the unmanned vehicle 2 traveling along the travel course.

Provided is the storage unit 39 having stored therein the correlation data between the temperature T of the hydraulic oil and the maximum steering speed V$\theta$max of the steering device 26. Accordingly, the maximum steering speed calculation unit 35 can easily calculate the maximum steering speed V$\theta$max of the steering device 26 corresponding to the temperature T of the hydraulic oil detected by the temperature sensor 17 based on the temperature data of the hydraulic oil detected by the temperature sensor 17 and the correlation data stored in the storage unit 39.

Meanwhile, in Step S13 described above, although the maximum steering speed calculation unit 35 calculates the maximum steering speed V$\theta$max by means of the first calculation method of the maximum steering speed V$\theta$max described with reference to FIGS. 4 and 5, the maximum steering speed calculation unit 35 may calculate the maximum steering speed V$\theta$max by means of the second calculation method of the maximum steering speed V$\theta$max described with reference to FIG. 6. Meanwhile, the maximum steering speed calculation unit 35 may calculate the maximum steering speed V$\theta$max by means of both the first calculation method and the second calculation method of the maximum steering speed V$\theta$max.

Second Embodiment

A second embodiment will be described. In the following description, similar or identical components to those in the above embodiment are labeled with the same reference signs, and description of the duplicate components is simplified or omitted.

In the above first embodiment, the travel parameter includes the limiting travel speed Vsmax of the unmanned vehicle 2, and the limiting travel speed Vsmax is changed based on the temperature data of the hydraulic oil. In the present embodiment, described is an example in which the travel parameter includes the steering speed V$\theta$ of the steering device 26, and in which the steering speed V$\theta$ of the steering device 26 is changed based on the temperature data of the hydraulic oil.

Also, in the above first embodiment, as much hydraulic oil as the maximum flow rate Qmax is supplied to the steering cylinder 13, and the steering device 26 is steered at the maximum steering speed V$\theta$max. In the present embodiment, as much hydraulic oil as a flow rate Q which is less than the maximum flow rate Qmax is supplied to the steering cylinder 13 in some cases. As described above, the maximum flow rate Qmax for the steering cylinder 13 is a flow rate of the hydraulic oil supplied to the steering cylinder 13 when the first flow rate adjusting valve enabling the flow rate Q of the hydraulic oil per unit time supplied to the steering cylinder 13 to be adjusted is set in a fully opened state. The flow rate Q which is less than the maximum flow rate Qmax is a flow rate of the hydraulic oil supplied to the steering cylinder 13 when the first flow rate adjusting valve is not at the maximum opening degree (in the fully opened state) but is adjusted at a predetermined opening degree which is lower than the maximum opening degree. In a case in which the travel speed Vs of the unmanned vehicle 2 is high, or in which the change rate of the curvature of the curve which the unmanned vehicle 2 goes around is high (in a case in which the degree of curve is high), the steering device 26 needs to be actuated at high speed. In this case, as much hydraulic oil as the maximum flow rate Qmax is supplied to the steering cylinder 13. On the other hand, in a case in which the travel speed Vs of the unmanned vehicle 2 is low, or in which the change rate of the curvature of the curve which the unmanned vehicle 2 goes around is low (in a case in which the degree of curve is low), the steering device 26 may be actuated at low speed. In this case, as much hydraulic oil as the flow rate Q which is less than the maximum flow rate Qmax is supplied to the steering cylinder 13. The command output unit 36 adjusts the flow rate Q of the hydraulic oil supplied to the steering cylinder 13 based on the temperature data of the hydraulic oil and changes the steering speed V$\theta$.

Figure 9:
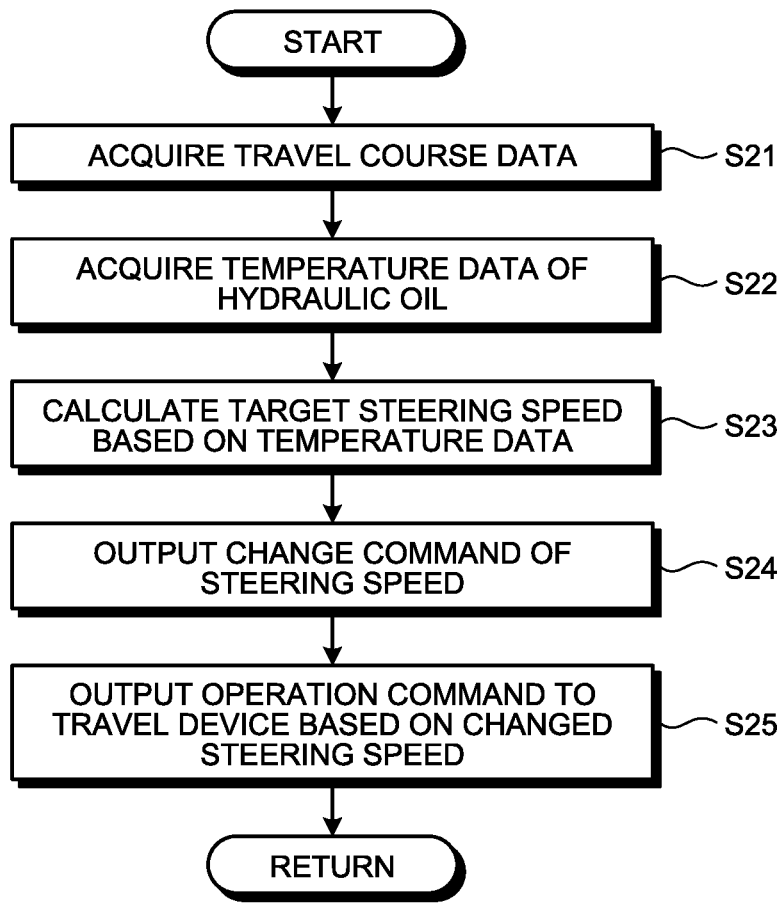
FIG. 9 is a flowchart illustrating an example of the control method for an unmanned vehicle according to a second embodiment.

FIG. 9 is a flowchart illustrating an example of the control method for the unmanned vehicle 2 according to the present embodiment. In the management device 3, the travel course generation unit 3A generates travel course data. The travel course data includes curvature of a travel course and steering speed V$\theta$def indicating an initial value for the steering speed V$\theta$ of the steering device 26 in the travel course. The steering speed V$\theta$def is steering speed V$\theta$ at which the unmanned vehicle 2 can travel along the curve in the travel course when the temperature T of the hydraulic oil is a specified temperature (for example, an ordinary temperature). In a case in which the temperature T of the hydraulic oil reaches the specified temperature, the steering device 26 is actuated at the steering speed V$\theta$def. Hence, the unmanned vehicle 2 can travel along the curve in the travel course at the travel speed Vsdef. The management device 3 transmits the generated travel course data via the communication system 4 to the control device 30 for the unmanned vehicle 2.

In the control device 30, the travel course data acquisition unit 32 acquires the travel course data (Step S21). By acquiring the travel course data, the travel course data acquisition unit 32 can acquire the change rate of the curvature of the curve in the travel course. By acquiring the travel course data, the travel course data acquisition unit 32 can also acquire the travel speed Vsdef and the steering speed Vθdef.

The temperature data acquisition unit 33 acquires temperature data of the hydraulic oil from the temperature sensor 17 (Step S22).

The command output unit 36 calculates target steering speed Vθref of the steering device 26 at which the unmanned vehicle 2 can travel along the curve in the travel course when the unmanned vehicle 2 goes around the curve in the travel course at the travel speed Vsdef based on the temperature data of the hydraulic oil acquired by the temperature data acquisition unit 33 (Step S23).

The storage unit 39 has stored therein correlation data indicating a relationship between the temperature T of the hydraulic oil and the maximum steering speed Vθmax of the steering device 26 corresponding to the temperature T of the hydraulic oil. In the present embodiment, the target steering speed Vθref when the hydraulic oil is at a certain temperature T is indicated by the maximum steering speed Vθmax corresponding to the temperature T.

The maximum steering speed Vθmax may be calculated by means of the first calculation method of the maximum steering speed Vθmax described with reference to FIGS. 4 and 5 or the second calculation method of the maximum steering speed Vθmax described with reference to FIG. 6.

The command output unit 36 outputs a change command for changing the steering speed Vθdef into the target steering speed Vθref when the target steering speed Vθref is lower than the steering speed Vθdef (Step S24).

That is, the command output unit 36 changes the steering speed Vθ from the steering speed Vθdef to the target steering speed Vθref so that the unmanned vehicle 2 may travel along the travel course when the unmanned vehicle 2 travels at the travel speed Vsdef (specified travel speed).

The travel control unit 37 outputs to the travel device 21 an operation command for controlling the travel device 21 of the unmanned vehicle 2 including the steering device 26 based on the changed target steering speed Vθref (Step S25).

The unmanned vehicle 2 goes around the curve in the travel course while being steered at the changed target steering speed Vθref. Accordingly, even in a case in which the steering responsiveness of the steering device 26 is low, the unmanned vehicle 2 can travel along the travel course at the travel speed Vsdef.

As described above, according to the present embodiment, in a case in which the temperature T of the hydraulic oil is low, and in which desired steering speed Vθ cannot be achieved when as much hydraulic oil as a certain flow rate Q is supplied to the steering cylinder 13, the flow rate Q of the hydraulic oil supplied to the steering cylinder 13 is raised, and the steering speed Vθ is raised. Accordingly, the unmanned vehicle 2 can travel along the travel course at the travel speed Vsdef (specified travel speed).

Third Embodiment

A third embodiment will be described. In the following description, similar or identical components to those in the above embodiment are labeled with the same reference signs, and description of the duplicate components is simplified or omitted.

In the description of the above embodiment, by adjusting the travel parameter while the unmanned vehicle 2 is traveling, the unmanned vehicle 2 travels along the travel course even in a case in which the temperature T of the hydraulic oil is low.

In the present embodiment, described is an example in which, by raising the temperature T of the hydraulic oil before start of traveling of the unmanned vehicle 2, the steering responsiveness is improved, and in which the unmanned vehicle 2 travels along the travel course.

Figure 10:
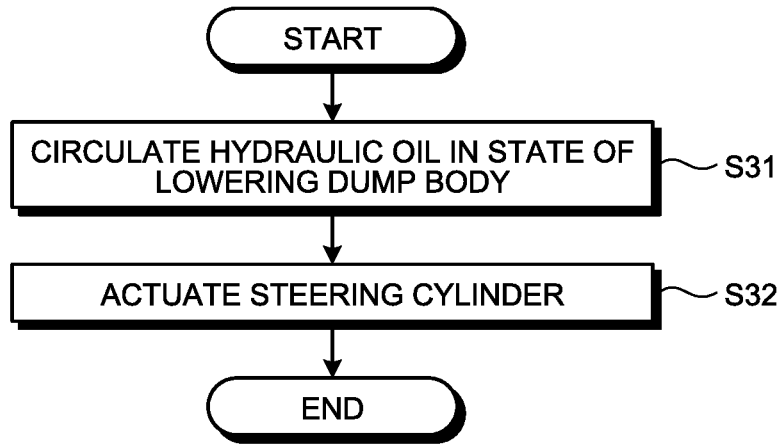
FIG. 10 is a flowchart illustrating an example of the control method for an unmanned vehicle according to a third embodiment.

FIG. 10 is a flowchart illustrating an example of the control method for the unmanned vehicle 2 according to the present embodiment. Before start of traveling of the unmanned vehicle 2, that is, in a state in which rotation of the wheel 27 of the unmanned vehicle 2 stops, the valve control unit 38 circulates the hydraulic oil in at least a part of the hydraulic circuit 16 in which the hydraulic oil supplied to the hoist cylinder 14 flows. In the present embodiment, the valve control unit 38 discharges the hydraulic oil from the hydraulic pump 11 in a state in which the dump body 23 is lowered and circulates the hydraulic oil in at least a part of the hydraulic circuit 16 including the flow path 16C.

Figure 11:
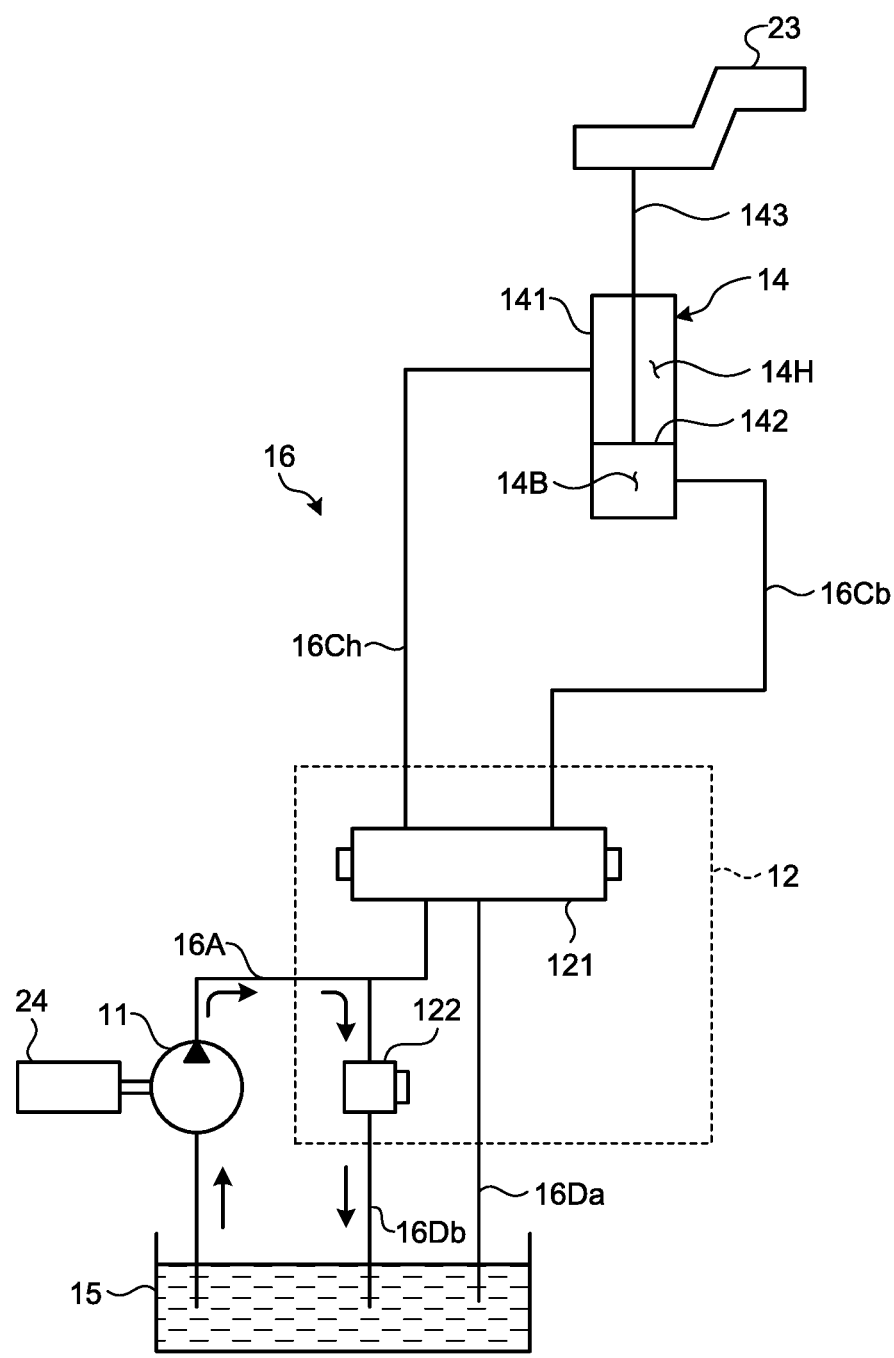
FIG. 11 schematically illustrates a part of a hydraulic circuit according to the third embodiment.

FIG. 11 schematically illustrates a part of the hydraulic circuit 16 according to the present embodiment. The hoist cylinder 14 includes a cylinder tube 141 including a bottom, a piston 142 partitioning the internal space of the cylinder tube 141 into a bottom chamber 14B and a head chamber 14H, and a rod 143 connected to the piston 142.

A flow path 16Cb is connected to the bottom chamber 14B. A flow path 16Ch is connected to the head chamber 14H. The valve device 12 includes a flow rate adjusting valve 121 (the second flow rate adjusting valve) connected to the flow path 16Cb and the flow path 16Ch and a relief valve 122. The flow path 16A is connected to the hydraulic pump 11. A flow path 16Da is connected to the flow rate adjusting valve 121. A flow path 16Db is connected to the flow path 16A. The relief valve 122 is arranged on the flow path 16Db.

The flow rate adjusting valve 121 is actuated based on a control command from the valve control unit 38. The flow rate adjusting valve 121 includes a direction control valve. The valve control unit 38 controls the flow rate adjusting valve 121 so that the hydraulic oil discharged from the hydraulic pump 11 may be supplied to either the bottom chamber 14B or the head chamber 14H.

The hydraulic oil discharged from the hydraulic pump 11 is supplied via the flow path 16A, the flow rate adjusting valve 121, and the flow path 16Cb to the bottom chamber 14B. When the hydraulic oil is supplied to the bottom chamber 14B, the hoist cylinder 14 expands, the dump body 23 is raised, and a dump operation is performed.

Also, the hydraulic oil discharged from the hydraulic pump 11 is supplied via the flow path 16A, the flow rate adjusting valve 121, and the flow path 16Ch to the head chamber 14H. When the hydraulic oil is supplied to the head chamber 14H, the hoist cylinder 14 contracts, and the dump body 23 is lowered.

In the present embodiment, the valve control unit 38 controls actuation of the hydraulic pump 11 and actuation of the valve device 12. When the temperature T of the hydraulic oil is raised, the valve control unit 38 keeps actuating the hydraulic pump 11 in a state of lowering the dump body 23. The state of lowering the dump body 23 includes a state in which the piston 142 is moved to an end portion on the bottom side of the cylinder tube 141 (to a stroke end). When the hydraulic pump 11 keeps being actuated in the state of lowering the dump body 23, the pressure in the head chamber 14H is raised. When the pressure in the head chamber 14H is raised to reach a threshold value or higher, the relief valve 122 is opened. Consequently, the hydraulic oil discharged from the hydraulic pump 11 and flowing into the flow path 16A is returned via the relief valve 122 and the flow path 16Db to the hydraulic oil tank 15. That is, when the hydraulic pump 11 keeps being actuated in the state of lowering the dump body 23, the hydraulic oil discharged from the hydraulic pump 11 circulates in a part of the circulation path of the hydraulic circuit 16 including the flow path 16A, the relief valve 122, the flow path 16Db, and the hydraulic oil tank 15 (Step S31).

When the hydraulic oil circulates, the temperature T of the hydraulic oil is raised due to the frictional resistance with the flow path. Accordingly, the temperature T of the hydraulic oil housed in the hydraulic oil tank 15 is raised.

After the hydraulic oil circulates in at least a part of the hydraulic circuit 16 including the flow path 16A in which the hydraulic oil supplied to the hoist cylinder 14 flows to raise the temperature T of the hydraulic oil in the hydraulic oil tank 15, the valve control unit 38 controls the valve device 12 so that the steering cylinder 13 may be actuated before start of traveling of the unmanned vehicle 2 (Step S32).

When the steering cylinder 13 is actuated before start of traveling of the unmanned vehicle 2, the direction of the tire attached to the front wheel 27F is switched in a state in which the tire and the ground contact each other. In other words, a stationary steering operation is performed. When the hydraulic oil is supplied from the hydraulic pump 11 to the steering cylinder 13 to actuate the steering cylinder 13, the hydraulic oil in the hydraulic oil tank 15 the temperature T of which is raised is supplied to the steering cylinder 13.

In a state in which the hydraulic oil the temperature T of which is raised is supplied to the steering cylinder 13, travel of the unmanned vehicle 2 is started. Since the hydraulic oil the temperature T of which is raised is supplied to the steering cylinder 13, the steering responsiveness of the steering device 26 is restricted from being lowered.

Meanwhile, the processing described with reference to FIG. 10 may be performed when the temperature T of the hydraulic oil detected by the temperature sensor 17 is equal to or lower than an allowable value before start of traveling of the unmanned vehicle 2.

Computer System

Figure 12:
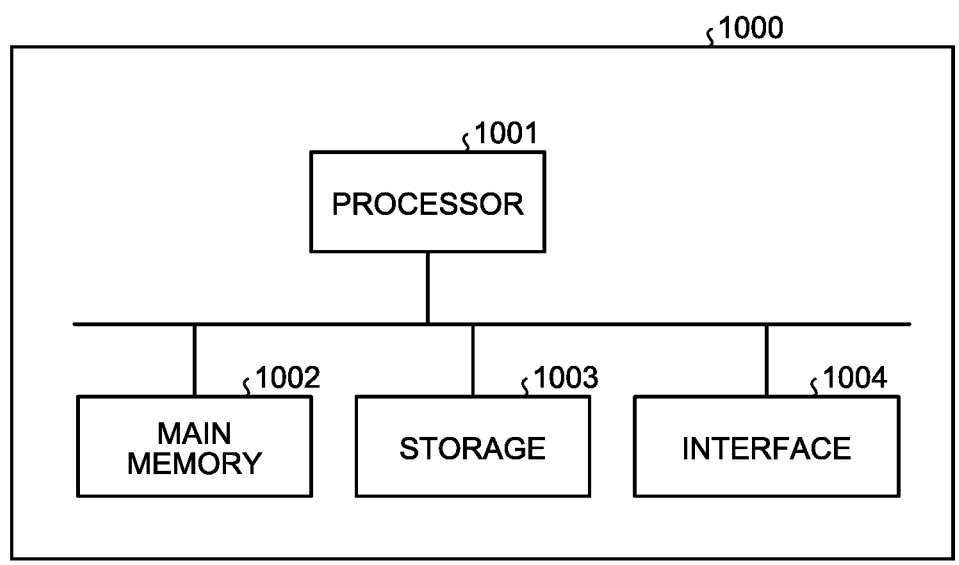
FIG. 12 is a block diagram illustrating an example of a computer system.

FIG. 12 is a block diagram illustrating an example of a computer system 1000. Each of the aforementioned management device 3 and control device 30 includes the computer system 1000. The computer system 1000 includes a processor 1001 such as a central processing unit (CPU), a main memory 1002 including a non-volatile memory such as a read only memory (ROM) and a volatile memory such as a random access memory (RAM), a storage 1003, and an interface 1004 including an input/output circuit. The aforementioned functions of the management device 3 and control device 30 are stored as programs in the storage 1003. The processor 1001 reads out a program from the storage 1003, loads the program into the main memory 1002, and executes the aforementioned processing in accordance with the program. Note that the program may be distributed to the computer system 1000 via a network.

Meanwhile, in the above embodiments, at least a part of the functions of the control device 30 for the unmanned vehicle 2 may be provided in the management device 3, and at least a part of the functions of the management device 3 may be provided in the control device 30.

The computer system 1000 including at least either the management device 3 or the control device 30 can execute acquisition of the temperature data of the hydraulic oil supplied to the steering cylinder 13 actuating the steering device 26 of the unmanned vehicle 2 and output of the change command for changing the travel parameter of the unmanned vehicle 2 based on the temperature data of the hydraulic oil and the travel course data of the unmanned vehicle 2. Accordingly, the unmanned vehicle 2 can travel along the travel course.

Other Embodiments

Meanwhile, in the aforementioned first embodiment, the travel parameter includes the limiting travel speed Vsmax of the unmanned vehicle 2, and in the aforementioned second embodiment, the travel parameter includes the steering speed Vθ of the steering device 26. Also, in the aforementioned embodiments, the maximum steering speed Vθmax is calculated based on the first calculation method or the second calculation method, and the travel parameter is changed based on the calculated maximum steering speed Vθmax. Correlation data between the temperature T of the hydraulic oil and the travel parameter may be stored in the storage unit 39, and the command output unit 36 may output a change command for changing the travel parameter based on the temperature data of the hydraulic oil acquired by the temperature data acquisition unit 33 and the correlation data stored in the storage unit 39. For example, in a case in which the correlation data (table data) between the temperature T of the hydraulic oil and the limiting travel speed Vsmax of the unmanned vehicle 2 is stored in the storage unit 39, the command output unit 36 may output a change command for changing the limiting travel speed Vsmax of the unmanned vehicle 2 based on the temperature data of the hydraulic oil acquired by the temperature data acquisition unit 33 and the correlation data stored in the storage unit 39. Also, in a case in which the correlation data (table data) between the temperature T of the hydraulic oil and the steering speed Vθ of the steering device 26 is stored in the storage unit 39, the command output unit 36 may output a change command for changing the steering speed Vθ of the steering device 26 based on the temperature data of the hydraulic oil acquired by the temperature data acquisition unit 33 and the correlation data stored in the storage unit 39.

Meanwhile, in the aforementioned embodiments, the temperature sensor 17 includes the temperature sensor 17A detecting a temperature of the hydraulic oil in the flow path 16B connected to the steering cylinder 13 and the temperature sensor 17B detecting a temperature of the hydraulic oil in the hydraulic oil tank 15. The temperature sensor 17 has only to be able to detect a temperature of the hydraulic oil supplied to the steering cylinder 13, and a location in which the temperature sensor 17 is installed is not limited. The temperature sensor 17 can be installed in an arbitrary location of the hydraulic circuit 16.

Meanwhile, in the aforementioned embodiments, the travel course data is generated in the management device 3, and the unmanned vehicle 2 travels based on the travel course data transmitted from the management device 3. The control device 30 for the unmanned vehicle 2 may generate the travel course data. That is, the control device 30 may include a travel course generation unit. Also, each of the management device 3 and the control device 30 may include a travel course generation unit.

Meanwhile, in the aforementioned embodiments, the unmanned vehicle 2 is a dump truck serving as a kind of a carrying vehicle. The unmanned vehicle 2 may be a working machine including working equipment such as an excavator and a bulldozer.

REFERENCE SIGNS LIST

1 SUPERVISING SYSTEM
2 UNMANNED VEHICLE
3 MANAGEMENT DEVICE
3A TRAVEL COURSE GENERATION UNIT
3B STORAGE UNIT
3C COMMUNICATION UNIT
4 COMMUNICATION SYSTEM
5 SUPERVISING FACILITY
6 WIRELESS COMMUNICATION UNIT
10 HYDRAULIC SYSTEM
11 HYDRAULIC PUMP
12 VALVE DEVICE
13 STEERING CYLINDER (FIRST HYDRAULIC ACTUATOR)
14 HOIST CYLINDER (SECOND HYDRAULIC ACTUATOR)
14B BOTTOM CHAMBER
14H HEAD CHAMBER
15 HYDRAULIC OIL TANK
16 HYDRAULIC CIRCUIT
16A FLOW PATH
16B FLOW PATH
16C FLOW PATH
16D FLOW PATH
17 TEMPERATURE SENSOR
17A TEMPERATURE SENSOR
17B TEMPERATURE SENSOR
18 STEERING ANGLE SENSOR
21 TRAVEL DEVICE
22 VEHICLE MAIN BODY
23 DUMP BODY
24 DRIVE DEVICE
25 BRAKE DEVICE
26 STEERING DEVICE
27 WHEEL
27F FRONT WHEEL
27R REAR WHEEL
28 POSITION DETECTION DEVICE
29 WIRELESS COMMUNICATION UNIT
30 CONTROL DEVICE
31 COMMUNICATION UNIT
32 TRAVEL COURSE DATA ACQUISITION UNIT
33 TEMPERATURE DATA ACQUISITION UNIT
34A STEERING ANGLE DATA ACQUISITION UNIT
34B STEERING SPEED DATA CALCULATION UNIT
35 MAXIMUM STEERING SPEED CALCULATION UNIT
36 COMMAND OUTPUT UNIT
37 TRAVEL CONTROL UNIT
38 VALVE CONTROL UNIT
39 STORAGE UNIT
121 FLOW RATE ADJUSTING VALVE
122 RELIEF VALVE
131 CYLINDER TUBE
132 PISTON
133 ROD
141 CYLINDER TUBE
142 PISTON
143 ROD

The invention claimed is:

1. A control device for an unmanned vehicle comprising:
a temperature data acquisition unit acquiring temperature data of hydraulic oil supplied to a first hydraulic actuator actuating a steering device of the unmanned vehicle;
a command output unit outputting a change command for changing a travel parameter of the unmanned vehicle based on the temperature data;
a temperature sensor detecting a temperature of the hydraulic oil in a flow path connected to a steering cylinder of the steering device; and
a temperature sensor detecting a temperature of the hydraulic oil in a hydraulic oil tank of the steering device;
wherein the temperature data acquisition unit acquires temperature data indicating a temperature of the hydraulic oil, supplied to the steering cylinder, detected by the temperature sensors.

2. The control device for an unmanned vehicle according to claim 1, wherein
the travel parameter includes limiting travel speed of the unmanned vehicle, and
the command output unit changes the limiting travel speed based on the temperature data.

3. The control device for an unmanned vehicle according to claim 2, comprising:
a maximum steering speed calculation unit calculating maximum steering speed of the steering device based on the temperature data,
wherein the command output unit changes the limiting travel speed based on the maximum steering speed.

4. The control device for an unmanned vehicle according to claim 3, comprising:
a storage unit storing correlation data between a temperature of the hydraulic oil and the maximum steering speed of the steering device,
wherein the maximum steering speed calculation unit calculates the maximum steering speed based on the temperature data and the correlation data.

5. The control device for an unmanned vehicle according to claim 3, comprising:
a steering speed data calculation unit calculating steering speed data of the steering device when the hydraulic oil is supplied to the first hydraulic actuator at a maximum flow rate,
wherein the maximum steering speed calculation unit calculates the maximum steering speed of the steering device based on the steering speed data.

6. The control device for an unmanned vehicle according to claim 1, wherein
the travel parameter includes steering speed of the steering device, and
the command output unit changes the steering speed based on the temperature data.

7. The control device for an unmanned vehicle according to claim 1, comprising:
a valve control unit controlling a valve device that adjusts a flowing state of the hydraulic oil in a hydraulic circuit connected to the first hydraulic actuator,
wherein the valve control unit controls the valve device such that the first hydraulic actuator is actuated before start of traveling of the unmanned vehicle.

8. The control device for an unmanned vehicle according to claim 7, wherein
the hydraulic circuit is connected to a second hydraulic actuator, and the valve control unit circulates the hydraulic oil in at least a part of the hydraulic circuit in which the hydraulic oil supplied to the second hydraulic actuator flows before start of traveling of the unmanned vehicle.

9. A control method for an unmanned vehicle comprising:
acquiring temperature data of hydraulic oil supplied to a first hydraulic actuator actuating a steering device of the unmanned vehicle with a temperature data acquisition unit;
outputting a change command for changing a travel parameter of the unmanned vehicle based on the temperature data;
detecting a temperature of the hydraulic oil in a flow path connected to a steering cylinder of the steering device; and
detecting a temperature of the hydraulic oil in a hydraulic oil tank of the steering device;
wherein temperature data indicating a temperature of the hydraulic oil, supplied to the steering cylinder, is acquired.

10. The control device for the unmanned vehicle according to claim 1 further comprising:
a temperature sensor;
wherein the temperature data acquisition unit acquires temperature data indicating a temperature of the hydraulic oil, supplied to a steering cylinder of the steering device, detected by the temperature sensor.

11. The control device for the unmanned vehicle according to claim 3, further comprising:
a steering angle sensor;
a steering speed data calculation unit calculating steering speed data of the steering device;
wherein the maximum steering speed calculation unit calculates the maximum steering speed of the steering device based on a detection data of the steering angle sensor.

12. The control device for the unmanned vehicle according to claim 1, wherein when a temperature of the hydraulic oil is low, and a viscosity of the hydraulic oil is high, the command output unit lowers a limiting travel speed of the unmanned vehicle to let the unmanned vehicle travel at a low speed.

13. The control device for the unmanned vehicle according to claim 1, wherein when a temperature of the hydraulic oil is high, and a viscosity of the hydraulic oil is low, the command output unit raises a limiting travel speed of the unmanned vehicle to let the unmanned vehicle travel at a high speed.

14. The control device for the unmanned vehicle according to claim 1, wherein the command output unit changes a limiting travel speed serving as the travel parameter of the unmanned vehicle based on the temperature data of the hydraulic oil so that the unmanned vehicle may travel along a travel course.

15. The control device for the unmanned vehicle according to claim 1, wherein when a temperature of the hydraulic oil is low, the unmanned vehicle can travel along a travel course by setting a limiting travel speed of the unmanned vehicle to a low value to cause the unmanned vehicle to travel at a low speed.

16. The control device for the unmanned vehicle according to claim 1, wherein when a temperature of the hydraulic oil is low, and a change rate of a curvature of a curve in a travel course is high, the unmanned vehicle can travel along the travel course by setting a limiting travel speed of the unmanned vehicle to a lower value to cause the unmanned vehicle to travel at a lower speed.

17. The control device for the unmanned vehicle according to claim 1, wherein when a temperature of the hydraulic oil is high, the unmanned vehicle can travel along a travel course while a work efficiency (carrying efficiency) of the unmanned vehicle can be improved by setting a limiting travel speed of the unmanned vehicle to a high value to cause the unmanned vehicle to travel at a high speed.

18. The control device for the unmanned vehicle according to claim 1, wherein a lowering of a tracking performance, indicating travel performance of the unmanned vehicle traveling along a travel course, can be restricted.

19. A control device for an unmanned vehicle comprising:
a temperature data acquisition unit acquiring temperature data of hydraulic oil supplied to a first hydraulic actuator actuating a steering device of the unmanned vehicle; and
a command output unit outputting a change command for changing a travel parameter of the unmanned vehicle based on the temperature data,
wherein the hydraulic oil circulates and a temperature of the hydraulic oil is raised due to a frictional resistance with a flow path, and accordingly the temperature of the hydraulic oil housed in a hydraulic oil tank is raised,
whereby the hydraulic oil is supplied from a hydraulic pump to a steering cylinder to actuate the steering cylinder in the steering device, and the hydraulic oil in the hydraulic oil tank, the temperature of which is raised, is supplied to the steering cylinder,
wherein in a state in which the hydraulic oil, the temperature of which is raised, is supplied to the steering cylinder, travel of the unmanned vehicle is started, and
whereby the hydraulic oil, the temperature of which is raised, is supplied to the steering cylinder and a steering responsiveness of the steering device is restricted from being lowered.

* * * * *